Oct. 14, 1952     M. E. GIFFORD     2,613,972
DEVICE FOR OPERATION OF FARM GATES
Filed June 6, 1950
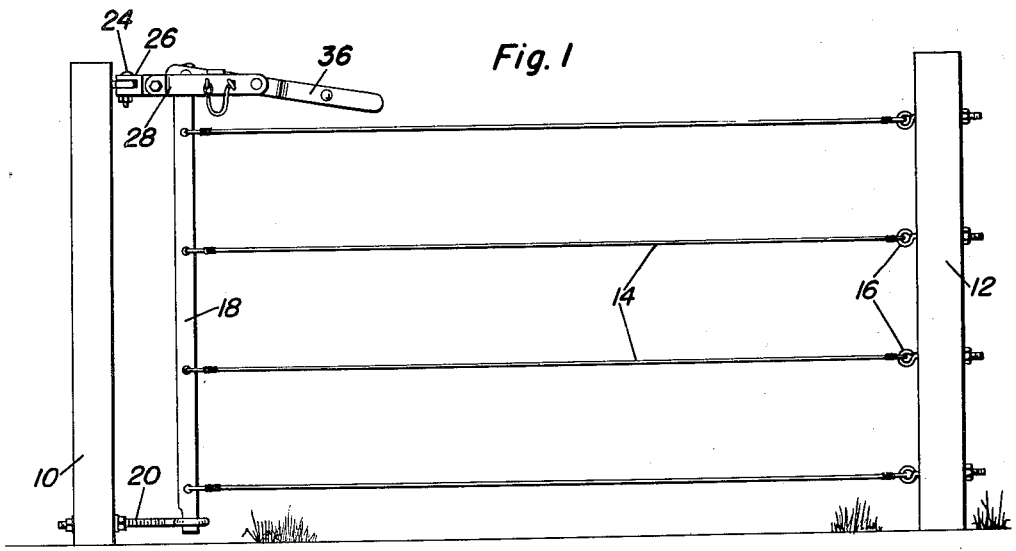
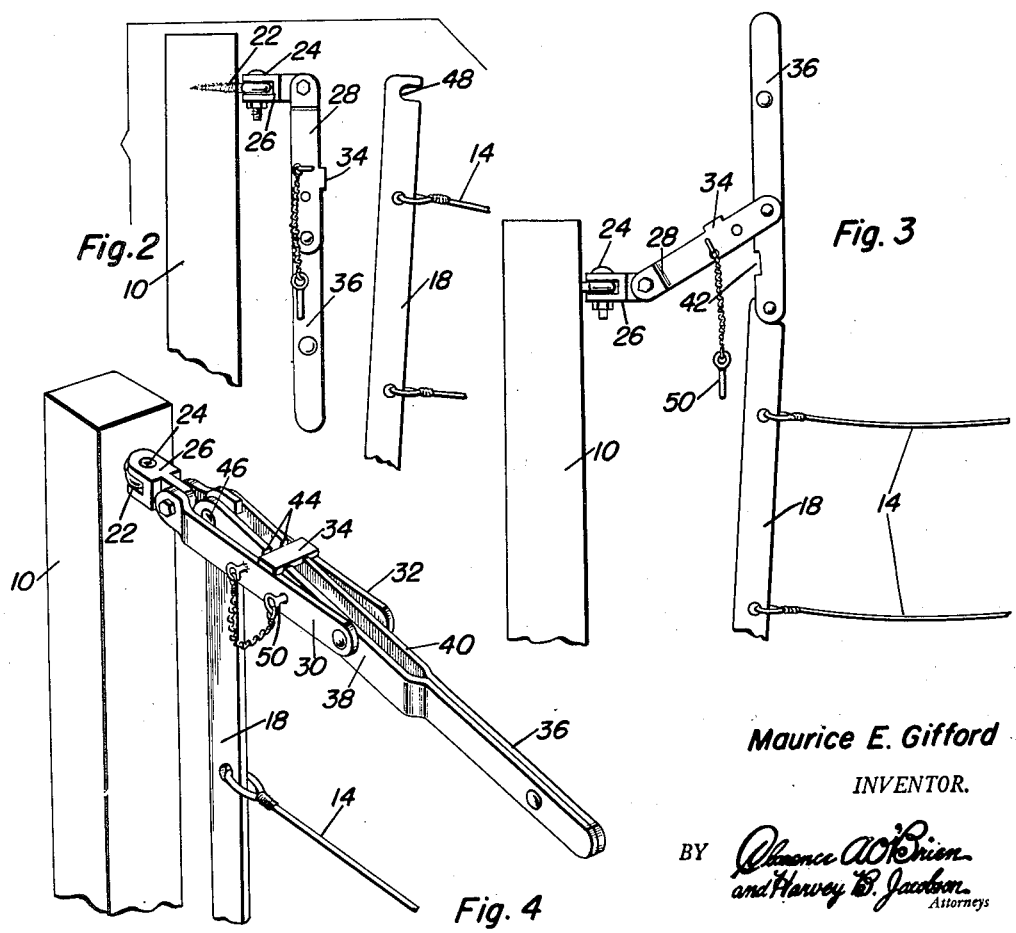
Maurice E. Gifford
INVENTOR.

Patented Oct. 14, 1952

2,613,972

UNITED STATES PATENT OFFICE 2,613,972

DEVICE FOR OPERATION OF FARM GATES

Maurice E. Gifford, Berryville, Ark., assignor to Covert Electric Machinery Company, Joplin, Mo.

Application June 6, 1950, Serial No. 166,308

2 Claims. (Cl. 292—247)

This invention relates to closure devices, and more particularly to a novel means for opening and closing a farm gate.

An object of this invention is to provide a novel means in combination with a fence gate for opening and closing the gate relative to the fence, which device will include means for securing the device against accidental actuation by cattle or the like.

A further object of this invention is to provide a novel device for operating a farm gate which can be readily opened and closed in a secure and positive manner with great convenience and efficiency, and which device is adaptable for barbed wire, chicken wire and all other similar types of woven wire fences of which fences for pastures, farms and the like are constructed.

Still further objects of the invention reside in the provision of a device for operation of a farm gate that is strong, durable, highly efficient in operation, simple in construction and manufacture, capable of being manufactured from readily available material, easy to use, and which is relatively inexpensive.

These, together with the various ancillary objects and features of the invention, are attained by this device for operation of a farm gate, a preferred embodiment of which has been illustrated by way of example only, in the accompanying drawing, wherein:

Figure 1 is an elevational view showing the device in operative installation on a farm gate with the gate in a closed position;

Figure 2 is a partial elevational detail showing the farm gate in an open position;

Figure 3 is another elevational view of the farm gate shown in the process of being drawn to a closed position; and Figure 4 is a perspective view showing the device embodying the present invention in the closed position.

With continuing reference to the accompanying drawing, wherein like reference numerals designate similar parts throughout the various views, reference numerals 10 and 12 generally designate studs or posts which defines a passageway between which the gate is positioned and on which posts the various elements of the invention are emplaced. The invention provides means which employ an easy lever action and stiff leg movements so in the closing operation of the device all of the plurality of cables or wires 14 which are connected to eye bolts 16 in the post 12 are stretched taut. The eye bolts are connected at their other ends to a stanchion 18 which is provided with apertures for receiving the looped ends of these cables or wires 14. Obviously, however, barbed wire, or other woven wire strands may be used in lieu of the wires or cables 14.

Secured in the bottom portion of the post or stud 10 is an eye bolt 20 which is provided with a large loop for reception of the base of the stanchion 18. Adjacent the uppermost portion of the stud 10 is a lag screw 22 threadedly engaged in the post or stud. Detachably secured by means of a bolt 24 to the lag screw is a bifurcated connecting member 26 which has pivoted to its free end a link member 28 which includes a pair of spaced bars 30 and 32. Extending between the bars 30 and 32 and welded or elsewise secured thereto is a spacer member 34. Pivotally secured to the free end of the link 28 is a lever which is provided with a handle portion 36 and a pair of bifurcated end portions 38 and 40 which are formed with notches 42 and 44 therein for receiving the spacer member 34. Also extending between the bifurcated end portions is a pin 46 which is capable of engagement with the hooked portion 48 formed in the stanchion 18. There is also formed an aperture in the bar 30 which is capable of being aligned with an aperture in the bifurcated end portion 38 in order that a pin or key 50 can extend through the apertures when they are in alignment so as to lock the link and the lever together. This will prevent the farm gate from being actuated by accidental engagement therewith by cattle or other beasts. Hence, when it is desired to secure the gate, it is merely necessary to position the base of the stanchion within the eye bolt 20 and then engage the hook portion 48 of the stanchion 18 with the pin 46 and then pull the lever 36 downwardly by actuating the handle portion thereof. To release the gate and allow it to become opened, it is merely necessary to raise the lever.

Since from the foregoing the construction and advantages of this device for operation of a farm gate is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A fastener for flexible gates of the type including a plurality of flexible strands and a bar on one end thereof, comprising a screw eye mounted on a post, a connector mounted for horizontal swinging movement on said screw eye, a pair of spaced links pivotally mounted on said connector, a bifurcated lever pivotally mounted, at an intermediate point, between the free end portions of said links and including a handle on one end, said lever being adapted to straddle the gate bar, said bar having a notch in one end portion, a pin extending between the furcations of the lever and engageable in the notch for operatively connecting the lever to the gate, and means for securing said lever in operative position.

2. A fastener for flexible gates of the type including a plurality of flexible strands and a bar on one end thereof, comprising a screw eye mounted on a post, a connector mounted for horizontal swinging movement on said screw eye, a pair of spaced links pivotally mounted on said connector, a bifurcated lever pivotally mounted, at an intermediate point, between the free end portions of said links and including a handle on one end, said lever being adapted to straddle the gate bar, said bar having a notch in one end portion, a pin extending between the furcations of the lever and engageable in the notch for operatively connecting the lever to the gate, and means for securing said lever in operative position, said means comprising a stop bar extending between the links for arresting the lever when it reaches operative position, said lever having recesses therein for the reception of said stop bar, one of said links having an aperture therein, and a pin insertable in the aperture and engageable with the lever for securing same in engagement with the stop bar.

MAURICE E. GIFFORD.

REFERENCES CITED

The following references are of record in the file of this patent:

UNITED STATES PATENTS

| Number | Name | Date |
| --- | --- | --- |
| 724,940 | Reiterman | Apr. 7, 1903 |
| 753,175 | Stange | Feb. 23, 1904 |
| 1,451,768 | Falls | Apr. 17, 1923 |
| 1,458,664 | Schaefer | June 12, 1923 |
| 1,549,321 | Macfarland | Aug. 11, 1925 |

FOREIGN PATENTS

| Number | Country | Date |
| --- | --- | --- |
| 594,444 | France | June 22, 1925 |